United States Patent
Fujimoto et al.

(10) Patent No.: US 8,524,419 B2
(45) Date of Patent: Sep. 3, 2013

(54) ELECTRODE SUPPORT FOR FUEL CELLS

(75) Inventors: Tetsuro Fujimoto, Kirishima (JP); Shoji Yamashita, Kirishima (JP)

(73) Assignee: Kyocera Corporation, Kyoto (JP)

( * ) Notice: Subject to any disclaimer, the term of this patent is extended or adjusted under 35 U.S.C. 154(b) by 1416 days.

(21) Appl. No.: 11/575,130

(22) PCT Filed: Aug. 2, 2005

(86) PCT No.: PCT/JP2005/014493
§ 371 (c)(1),
(2), (4) Date: Dec. 7, 2007

(87) PCT Pub. No.: WO2006/030590
PCT Pub. Date: Mar. 23, 2006

(65) Prior Publication Data
US 2008/0145711 A1 Jun. 19, 2008

(30) Foreign Application Priority Data

Sep. 13, 2004 (JP) .................. 2004-265541
Sep. 13, 2004 (JP) .................. 2004-265542

(51) Int. Cl.
*H01M 4/36* (2006.01)
*H01M 4/48* (2010.01)

(52) U.S. Cl.
USPC ................ 429/532; 429/489; 429/496

(58) Field of Classification Search
USPC ................... 429/423–434, 523–534
See application file for complete search history.

(56) References Cited

FOREIGN PATENT DOCUMENTS

| JP | 02-262260 | 10/1990 |
|---|---|---|
| JP | 08-273675 | 10/1996 |
| JP | 09-082335 | 3/1997 |
| JP | 9082335 A | 3/1997 |
| JP | 09-092294 | 4/1997 |
| JP | 9092294 A | 4/1997 |
| JP | 10-241702 | 9/1998 |
| JP | 2002-352809 | 12/2002 |
| JP | 2004063226 A | 2/2004 |
| JP | 2004-146334 | 5/2004 |
| JP | 2004-179071 | 6/2004 |
| JP | 2004179071 A | 6/2004 |
| JP | 2005-190737 | 7/2005 |

OTHER PUBLICATIONS

Extended European search report dated Sep. 17, 2009 for corresponding European application 05768386.4.
European office action dated Mar. 17, 2011 for corresponding European application 05768386.4.

*Primary Examiner* — Patrick Ryan
*Assistant Examiner* — Muhammad Siddiquee
(74) *Attorney, Agent, or Firm* — DLA Piper LLP (US)

(57) ABSTRACT

An electrode support for fuel cells, the electrode support being made of a porous material having a Ni phase of Ni or NiO and an inorganic skeletal material phase, wherein an oxidation/reduction expansion-suppressing metal M of at least one selected from the group consisting of Fe, Co and Mn is solidly dissolved in the Ni phase or is biasedly distributed on the grain boundaries between the Ni phase and the inorganic skeletal material phase. The electrode support has its volume very little expanded or contracted even in an environment in which it is exposed to the reducing atmosphere and the oxidizing atmosphere alternately. The fuel cell having the fuel electrode, electrolyte layer and oxygen electrode formed on the electrode support effectively prevents the occurrence of cracks or exfoliation caused by expansion and the like when the reduction/oxidation cycle is repeated accompanying the generation of electricity and stop of generation, and maintains reliability very excellently over extended periods of time.

7 Claims, 11 Drawing Sheets

ELECTRODE SUPPORT FOR FUEL CELLS

TECHNICAL FIELD

The present invention relates to an electrode support for fuel cells. More specifically, this invention relates to an electrode support which is used in a solid oxide fuel cell having an electrode structure including a fuel electrode and an oxygen electrode with the electrolyte layer held therebetween, said electrode support supporting the electrode structure or a laminate of the electrolyte layer and the oxygen electrode layer.

BACKGROUND ART

In recent years, various kinds of fuel cell assembles have been proposed as energy sources of the next generation containing a stack of fuel cells in a container.

FIG. 11 shows a stack (cell stack) of conventional solid oxide fuel cells. The cell stack has a plurality of fuel cells 1 which are arranged in alignment, a collector member 5 of a metal felt being interposed between the one fuel cell 1a and another fuel cell 1b which are neighboring each other, and a fuel electrode 7 of the one fuel cell 1a being electrically connected to an oxygen electrode (air electrode) 11 of the other fuel cell 1b.

The fuel cell 1 (1a, 1b) comprises an electrolyte 9 and the oxygen electrode 11 of electrically conducting ceramics formed in this order on the outer peripheral surface of the fuel electrode 7 of a cylindrical cermet (the inner space is a fuel gas passage), and has an interconnector 13 provided on the surface of the fuel electrode 7 which is covered with neither the electrolyte 9 nor the oxygen electrode 11. As is obvious from FIG. 11, the interconnector 13 is electrically connected to the fuel electrode 7 but so will not to be connected to the oxygen electrode 11.

The interconnector 13 is formed by using electrically conducting ceramics that is little subject to be degenerated with the fuel gas or the oxygen-containing gas such as the air. Here, the electrically conducting ceramics must be so dense as to reliably isolate the fuel gas flowing inside the fuel electrode 7 from the oxygen-containing gas flowing on the outer side of the oxygen electrode 11.

Further, the collector member 5 provided between the neighboring fuel cells 1a and 1b is electrically connected to the fuel electrode 7 of the one fuel cell 1a through the interconnector 13 and is further connected to the oxygen electrode 11 of the other fuel cell 1b. Therefore, the neighboring fuel cells are connected in series.

By containing the cell stack having the above-mentioned structure in the container, the fuel cell is used in the form of an assembly. For example, the fuel gas (hydrogen) flows inside the fuel electrode 7 and the air (oxygen) flows along the oxygen electrode 11, and electricity is generated at about 750 to about 1000° C.

In the above fuel cell, in general, the fuel electrode 7 comprises $N_1$ and $Y_2O_3$-containing $ZrO_2$ called stabilized zirconia (YSZ), the electrolyte 9 comprises $ZrO_2$ (YSZ) containing $Y_2O_3$, and the oxygen electrode 11 comprises a perovskite composite oxide of the type of lanthanum manganate.

As the method of producing the above fuel cells, there has been known a so-called co-firing method which fires the fuel electrode 7 and the electrolyte 9 simultaneously. The co-firing method is a very simple process having a decreased number of production steps, and is advantageous for improving the yield of cell production and for decreasing the cost.

Here, the $Y_2O_3$-containing $ZrO_2$ forming the electrolyte 9 has a coefficient of thermal expansion of about $10.8 \times 10^{-6}/°$C. whereas the fuel electrode 7 supporting the electrolyte 9 contains Ni having a coefficient of thermal expansion of $16.3 \times 10^{-6}/t$ which is very larger than that of YSZ. In conducting the co-firing as described above, therefore, a difference in the thermal expansion becomes great between the electrolyte 9 and the fuel electrode 7 supporting the electrolyte arousing such problems as the occurrence of cracks in the fuel electrode 7 and exfoliation of the electrolyte 9.

As a fuel cell solving the above problems, there has been known a fuel cell obtained by forming a fuel electrode, an electrolyte and an oxygen electrode layer on a support board of a porous material which contains Ni and a rare earth oxide ($Y_2O_3$ or $Yb_2O_3$) having a coefficient of thermal expansion lower than that of $ZrO_2$ (see patent document 1).

According to the above fuel cell, the coefficient of thermal expansion of the support board can be brought close to the coefficient of thermal expansion of the electrolyte. At the time of co-firing, therefore, it is made possible to suppress the occurrence of cracks in the fuel electrode and exfoliation of the electrolyte from the fuel electrode.

Patent document 1: JP-A-2004-146334

DISCLOSURE OF THE INVENTION

Concerning the inconvenience stemming from the thermal expansion as described above, various proposals have been made as taught in the patent document 1. The fuel cell, however, further involves a problem of expansion due to the oxidation/reduction cycles in addition to the thermal expansion.

That is, at the time of generating electricity, the interior of the fuel cell is exposed to the reducing atmosphere due to the supply of the fuel gas (hydrogen). When the generation is halted, however, no fuel gas is fed into the cell which is under a high-temperature condition from the standpoint of safety and economy. Therefore, the interior of the cell changes from the reducing atmosphere into the oxidizing atmosphere. In general, however, in order to maintain a predetermined strength, the fuel cell uses an electrode support; i.e., an electrode structure is formed on the electrode support, and the electricity is collected through the electrode support. For example, in the cells of FIG. 11, the fuel electrode 7 is serving as an electrode support, and the electrolyte 9 and the oxygen electrode 11 are formed on the fuel electrode 7 which is the electrode support. The above electrode support, usually, occupies a majority proportion of the cell volume. Even in the fuel cell in which a laminated layer structure of fuel electrode, electrolyte and oxygen electrode is formed on the electrode support, the electrode support occupies a majority proportion of the cell. Therefore, stability of the electrode support plays an important role in the varying atmosphere.

Here, the electrode support contains a metal for imparting electrically conducting property, and Ni is usually used as the metal. Ni has a function as a reforming catalyst for forming the fuel gas (hydrogen) from the natural gas and makes it possible to effectively utilize the fuel. Besides, Ni is also contained in the fuel electrode and is desired in forming the fuel electrode on the electrode support and in preventing inconvenience caused by the diffusion of elements between the fuel electrode and the electrode support under high-temperature conditions. However, the metal such as Ni undergoes the oxidation in an oxidizing atmosphere of when the generation of electricity is discontinued. Accompanying this, therefore, the volume of the electrode support expands. Further, the metal that is oxidized undergoes the reduction in a reducing atmosphere. Therefore, the electrode support that has expanded, then, contracts. Therefore, if the oxidizing atmosphere changes into the reducing atmosphere, it is theoretically considered that the electrode support resumes its initial volume. In practice, however, the volume does not return to the initial state but remains in a slightly expanded state. Upon repetitively changing the atmosphere (i.e., repeating the generation and stop of generation), therefore, the volume of the electrode support gradually increases. Due to the expansion of the electrode support, therefore, cracks occur in the electrolyte formed on the electrode support, electrolyte exfoliates, or the electrode support itself is cracked, which are the causes of destruction fatal to the cells. So far, however, almost no approach has been made concerning the mechanism of expansion of volume of the electrode support due to a change in the atmosphere or concerning the prevention of expansion of the volume of the electrode support.

It is, therefore, an object of the present invention to provide an electrode support for fuel cells suppressing the expansion of volume even in an environment in which it is exposed to the reducing atmosphere and the oxidizing atmosphere alternately.

Another object of the present invention is to provide a fuel cell which has the above electrode support and features improved reliability for extended periods of time.

According to the present invention, there is provided an electrode support for fuel cells, the electrode support being made of a porous material having a Ni phase of Ni or NiO and an inorganic skeletal material phase, wherein an oxidation/reduction expansion-suppressing metal M of at least one selected from the group consisting of Fe, Co and Mn is solidly dissolved in the Ni phase or is biasedly distributed on the grain boundaries between the Ni phase and the inorganic skeletal material phase.

In the electrode support of the invention, it is desired that:
(1) the inorganic skeletal material is an oxide of a rare earth element;
(2) the inorganic skeletal material is $Y_2O_3$;
(3) the oxidation/reduction expansion-suppressing metal M is Mn, and is precipitated in the form of $NiMn_2O_4$, $MnYO_3$ or $Y_2NiO_6$ on the grain boundaries;
(4) the oxidation/reduction expansion-suppressing metal M is Fe, and is precipitated in the form of $NiFe_2O_4$ or $FeYO_3$ on the grain boundaries;
(5) Fe is biasedly distributed on the grain boundaries; and
(6) the oxidation/reduction expansion-suppressing metal M is Co, and is solidly dissolved in the Ni phase.

According to the present invention, further, there is provided a solid oxide fuel cell having a structure in which a fuel electrode, an electrolyte and an oxygen electrode are laminated in this order on one surface of the electrode support.

The invention further provides a cell stack obtained by electrically connecting a plurality of fuel cells in series, and a fuel cell assembly obtained by containing the cell stack in a container.

The electrode support for fuel cells of the invention is made of a porous material having a Ni phase (Ni or NiO) and an inorganic skeletal material phase. In particular, an important feature resides in that the oxidation/reduction expansion-suppressing metal M described above is solidly dissolved in the Ni phase or is biasedly distributed on the grain boundaries between the Ni phase and the inorganic skeletal material phase. Presence of the above metal M effectively suppresses the volume expansion caused by the reduction/oxidation cycles (repetition of change in the atmosphere between the reducing atmosphere and the oxidizing atmosphere).

That is, the Ni phase imparts the electrically conducting property and the function of the reforming catalyst to the electrode support while the inorganic skeletal material phase comprises an inorganic material which remains stable against the oxidizing atmosphere and the reducing atmosphere, and forms a basic skeleton of the support. When the support (porous member) having the Ni phase and the inorganic skeletal material phase is alternately exposed to the reducing atmosphere and the oxidizing atmosphere (reduction and oxidation are repeated), the reduction and oxidation are alternately repeated in the Ni phase. If oxidized, the volume expands by an amount Ni oxidized. If the oxide is reduced, therefore, it is theoretically considered that the volume contracts and the initial volume will be resumed. As described above, however, the initial volume is not really resumed even after the oxide is reduced, and the electrode support gradually expands as the reduction and oxidation are repeated. Though the mechanism of expansion of the support through the reduction/oxidation cycles has not been clarified yet, the present inventors presume it as described below.

If the Ni phase expands due to the oxidation, the inorganic skeletal material phase present around the Ni phase is pushed outward and the electrode support expands. Next, if the Ni phase reduces being exposed to the reducing atmosphere, NiO turns into Ni and contracts. However, the inorganic skeletal material (e.g., oxide of rare earth element) constituting the electrode support remains stable against the oxidation and reduction and exhibits poor wettability to the metal nickel (or oxide thereof). Therefore, even if the inorganic skeletal material phase in a state of being expanded by oxidation comes into favorable contact with the Ni phase that is expanded, the Ni phase partly separates away from the inorganic skeletal material phase when it is contracted due to the reduction (the inorganic skeletal material phase does not follow the Ni phase that contracts). As a result, it is considered that the volume of the electrode support that has expanded due to oxidation does not return back to the initial volume despite it is contracted by reduction and, therefore, the volume becomes slightly greater than the volume of before being oxidized.

According to the present invention, the expansion due to the reduction/oxidation cycles is suppressed by making present a particular metal M. The present inventors presume the mechanism of suppression as described below.

First, among the metals M for suppressing the oxidation/reduction expansion described above, Mn and Fe are reactive for Ni and inorganic skeletal material (e.g., $Y_2O_3$), and the reaction product thereof precipitates on the grain boundaries between the Ni phase and the inorganic skeletal material phase during the firing in the process for producing the electrode support or, if it is not the reaction product, are biasedly distributed on the grain boundaries in an enriched form. As a result, it is considered that wettability improves between the Ni phase and the inorganic skeletal material phase, and the inorganic skeletal material phase follows the Ni phase when the Ni phase contracts by reduction. Consequently, expansion due to the oxidation is offset by contraction at the time of reduction effectively avoiding the expansion of the electrode support due to the reduction/oxidation cycles. Further, these metals M are polyvalent metals and solidly dissolve in the Ni phase if their amounts are very small working to conspicuously increase the growing rate of the Ni oxide. When exposed to the oxidizing atmosphere, therefore, the Ni oxide grows into the pores in the electrode support which is the porous material. This is because oxygen is easily fed in the pores. Thus, as the Ni oxide quickly grows into the pores, the surrounding inorganic skeletal material phase is pulled by the Ni phase. Accordingly, expansion by the oxidation is very small in the oxidizing atmosphere, and contraction is often observed depending upon the cases. Therefore, the expansion due to the reduction/oxidation cycles is also effectively decreased even by an increase in the rate of growth of the Ni oxide due to the metal M that solidly dissolves in the Ni phase.

Further, among the oxidation/reduction expansion-suppressing metals M, Co entirely and solidly dissolves in the Ni phase and does not form a reaction product with the inorganic skeletal material. However, wettability is improved between the Ni phase in which Co is solidly dissolved and the inorganic skeletal material phase. As a result, in the same manner as described above, the inorganic skeletal material phase follows the Ni phase when the Ni phase contracts due to the reduction effectively avoiding the expansion of the electrode support caused by the reduction/oxidation cycles.

According to the present invention, precipitation of the reaction product of Ni or the inorganic skeletal material with the metal M, biased distribution thereof on the grain boundaries, and presence of the metal M solidly dissolved in Ni, can be confirmed by the X-ray diffraction (XRD) of the powder or by the X-ray microanalysis (EPMA) and, particularly, by the limited visual field electron diffraction image analysis (SAED) or the X-ray analysis (EDS), or by the secondary ion mass analysis (SIMS).

As described above, the electrode support of the present invention is suppressed from expanding despite of subjected to the reduction/oxidation cycles. As will become clear from Examples appearing later, the electrode support of the invention exhibits an absolute value of a coefficient of linear expansion of not larger than 0.2% after subjected to the reduction/oxidation cycles three times repetitively.

The electrode support of the invention can be used for the fuel cells by forming thereon the fuel electrode layer, electrolyte and oxygen electrode layer successively, works to effectively suppress cracks in the fuel electrode and in the electrolyte as well as exfoliation even when the start and stop are repeated, and contributes to improving reliability in the long run when put to a practical use in the general household where start/stop are frequent.

BEST MODE FOR CARRYING OUT THE INVENTION

The invention will now be described in detail with reference to the accompanying drawings.

Figure 1:
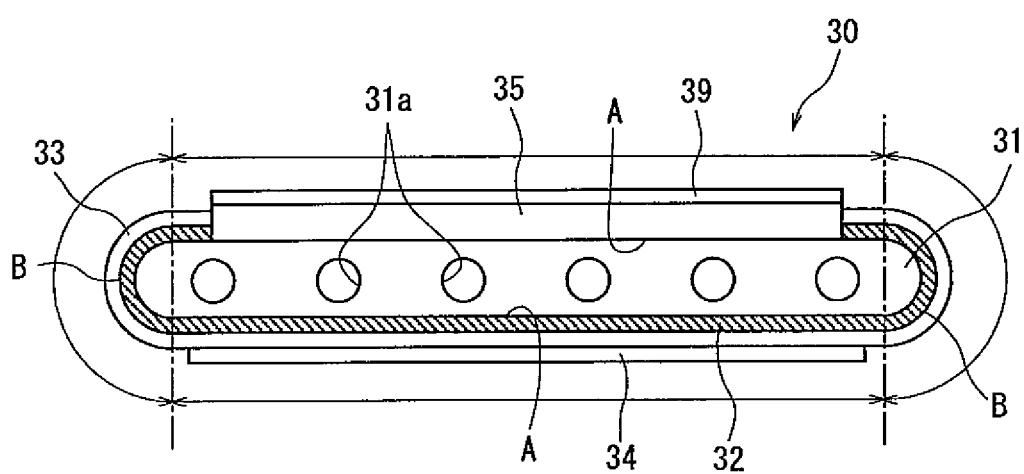
FIG. 1 is a transverse sectional view of a fuel cell provided with an electrode support of the present invention.
Figure 2:
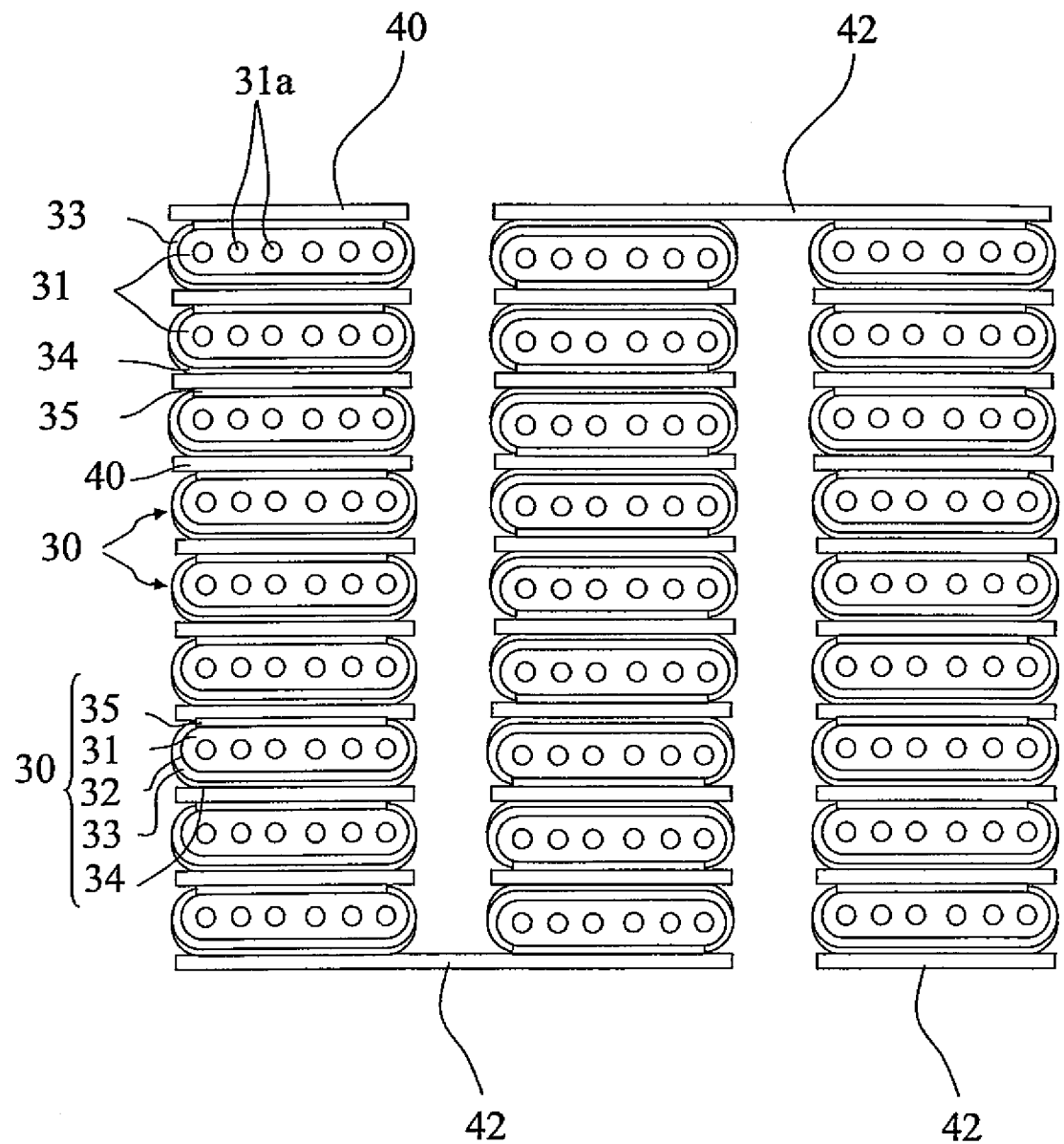
FIG. 2 is a transverse sectional view of cell stacks formed by using the fuel cells of FIG. 1.

FIG. 1 is a transverse sectional view of a fuel cell provided with an electrode support of the present invention, wherein the fuel cell generally designated at 30 is of the shape of a hollow flat plate and has an electrode support 31 which is flat in cross section and is of the shape of a slender plate as generally viewed. A plurality of fuel gas passages 31$a$ are penetrating through in the electrode support 31 in the lengthwise direction maintaining a suitable gap, and the fuel cell 30 has a structure in which various members are provided on the electrode support 31. Usually, a plurality of the fuel cells 30 are connected in series by a collector member 40 to form cell stacks as shown in FIG. 2. The cell stacks are contained in a predetermined container so as to be used as a fuel cell assembly.

As will be understood from the shape shown in FIG. 1, the electrode support 31 comprises a flat portion A and arcuate portions B at both ends of the flat portion A. Both surfaces of the flat portion A are formed nearly in parallel with each other, and a fuel electrode layer 32 is so provided as to cover the surfaces on one side of the flat portion A and of arcuate portions B on both sides thereof. Further, a dense electrolyte layer 33 is laminated so as to cover the fuel electrode layer 32, and an oxygen electrode layer 34 is laminated on the electrolyte layer 33 on one surface of the flat portion A so as to be opposed to the fuel electrode layer 32.

Further, an interconnector 35 is formed on the other surface of the flat portion A where neither the fuel electrode layer 32 nor the solid electrode layer 33 is laminated. As will be clear from FIG. 1, the fuel electrode layer 32 and the electrolyte layer 33 are extending up to both sides of the interconnector 35, so that the surface of the electrode support 31 will not be exposed to the outer side.

In the fuel cell of the above structure, a portion of the fuel electrode layer 32 facing the oxygen electrode layer 34 works as a fuel electrode to generate electricity. That is, an oxygen-containing gas such as the air flows through along the outer side of the oxygen electrode layer 34, and a fuel gas (hydrogen) flows through the gas passages 31$a$ in the electrode support 31. Upon being heated up to a predetermined working temperature, the electrode reaction represented by the following formula (1) takes place in the oxygen electrode layer 34 while the electrode reaction of the following formula (2) takes place in the fuel electrode layer 32 that works as the fuel electrode to generate electricity.

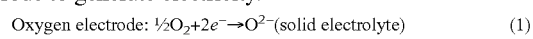
Oxygen electrode: $\frac{1}{2}O_2 + 2e^- \rightarrow O^{2-}$(solid electrolyte)  (1)

Fuel electrode: $O^{2-}$(solid electrolyte)$+H_2 \rightarrow H_2O + 2e^-$  (2)

The generated electric current is collected through the interconnector 35 attached to the electrode support 31. That is, a plurality of the fuel cells 30 of the above structure are connected in series by the collector member 40 to form cell stacks shown in FIG. 2. The cell stacks are contained in the container so as to be used as a fuel cell assembly. By flowing the fuel gas (hydrogen) and the oxygen-containing gas into predetermined portions, the fuel cell assembly works as a cell.

(Electrode Support 31)

In the fuel cell 30 having the above structure, the electrode support 31 must be gas-permeable to permit the fuel gas to permeate through up to the fuel electrode layer 32, must be electrically conducting to collect electricity through the interconnector 35, and must, further, be resistant against developing cracks or exfoliation caused by a difference in the thermal expansion at the time of fabricating the fuel cell 30 by co-firing that will be described later. In order to satisfy the above requirement, the electrode support 31 is made of an electrically conducting porous material and contains a phase (Ni phase) of metal nickel (Ni) or an oxide (NiO) thereof and an inorganic skeletal material phase that forms a basic skeleton.

That is, the Ni phase is for imparting electrically conducting property to the electrode support 31, and even when the Ni phase is formed by the nickel oxide (NiO) or the nickel oxide forms the Ni phase in the oxidizing atmosphere, a favorable electric conduction is exhibited at the time of generating electricity by reason that in the reducing atmosphere, the metal Ni forms the Ni phase. Further, the Ni phase also works as a reforming catalyst. Therefore, even in case a natural gas ($CH_4$) remains in the fuel gas (hydrogen), the Ni phase works to reform the natural gas into hydrogen making it possible to effectively utilize the fuel. Furthermore, the fuel electrode layer 32 that will be described later, usually, contains Ni. Upon containing the Ni phase in the electrode support 31, diffusion of elements can be effectively avoided between the electrode support 31 and the fuel electrode layer 32 at the time of firing or generating electricity.

The inorganic skeletal material phase is formed of an inorganic oxide which is stable against the oxidizing atmosphere or the reducing atmosphere, forms a basic skeleton of the electrode support 31 and imparts a predetermined strength thereto. As the inorganic oxide, an oxide of a rare earth element is preferably used in order to bring, particularly, the coefficient of thermal expansion of the electrode support 31 close to that of the electrolyte layer 33 and to prevent diffusion of elements into the electrolyte layer 33. As the oxides of rare earth elements, there can be exemplified $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$, and $Pr_2O_3$. Among them, however, $Y_2O_3$ is preferred since it is particularly inexpensive.

The above Ni component and the inorganic skeletal material are contained in the electrode support 31 at a volume ratio of Ni component:inorganic skeletal material=35:65 to 65:35 calculated as oxides in order to maintain a favorable electric conduction and to accomplish a coefficient of thermal expansion close to that of the electrolyte material forming the electrolyte layer 33.

The electrode support 31 must have a fuel gas permeability and, usually, has an open porosity of not smaller than 30% and, particularly, in a range of 35 to 50% and an electric conductivity of not smaller than 300 S/cm and, particularly, not smaller than 440 S/cm.

It is desired that the electrode support 31 has a flat portion A of a length of, usually, 15 to 35 mm and an arculate portion B of a length (length of arc) of about 3 to 8 mm. It is further desired that the electrode support 31 has a thickness (distance between both surfaces of the flat portion A) of about 2.5 to 5 mm.

The electrode support 31 of the present invention has various properties as described above, and it is particularly important that the oxidation/reduction expansion-suppressing metal M of at least one selected from the group consisting of Fe, Co and Mn is solidly dissolved in the Ni phase or is biasedly distributed on the grain boundaries between the Ni phase and the inorganic skeletal material phase. The biased distribution may be in the form of a reaction product with Ni or the organic skeletal material, or may be in an enriched form on the grain boundary. That is, when the electrode support 31 is formed of a porous material comprising the Ni phase and the inorganic skeletal phase as described above, the volume of the electrode support 31 expands due to the reduction/oxidation cycles accompanying the generation of electricity and stop of generation giving rise to the occurrence of cracks in the electrolyte layer 33 and exfoliation of the fuel electrode layer 32 spoiling reliability of the fuel cells over the long run. Upon making the above oxidation/reduction expansion-suppressing metal M present in the Ni phase or on the grain boundaries between the Ni phase and the inorganic skeletal material phase, however, it is allowed to effectively prevent the expansion of volume due to the reduction/oxidation cycles, that causes various inconveniences.

That is, among the oxidation/reduction expansion-suppressing metals M, Mn and Fe exhibit reactivity to Ni and the inorganic skeletal material, and form reaction products with Ni or inorganic skeletal material through the firing in a process for producing the electrode support. There can be exemplified $NiMn_2O_4$ as the reaction products of Mn and Ni; $MnYO_3$ as the reaction products of Mn and a rear earth element oxide ($Y_2O_3$); and $Y_2NiMnO_6$ as the reaction products of Mn, Ni and a rare earth element oxide. There can be further exemplified, $NiFe_2O_4$ as the reaction products of Fe and Ni; and $FeYO_3$ as the reaction products of Fe and a rear earth element oxide ($Y_2O_3$). The reaction product of the above metal M and Ni or inorganic skeletal material chiefly precipitates on the grain boundaries between the Ni phase and the inorganic skeletal material phase, and the reaction product that has precipitated on the grain boundaries improves the wettability between the Ni phase and the inorganic skeletal material phase. Further, the wettability between the Ni phase and the inorganic skeletal material phase is improved even by the metal M that is biasedly distributed on the grain boundaries in an enriched form in addition to the precipitation of the reaction product as will become understood from Experiment 2 appearing later. As a result, if the Ni phase contracts due to the reduction, the inorganic skeletal material phase follows the contraction of the Ni phase due to the reduction, whereby the expansion of the Ni phase due to the oxidation is offset by the contraction due to the reduction, effectively avoiding the expansion of the electrode support 31 due to the reduction/oxidation cycles.

Further, when the polyvalent metal (the metal M) is solidly dissolved in the Ni phase, the Ni oxide grows at a very increased rate as descried earlier. That is, in the oxidizing atmosphere of when the generation is discontinued, the Ni oxide grows into the interior of pores in the electrode support (porous material) 31, and the surrounding inorganic skeletal material phase is pulled inward by the Ni phase that grows due to the oxidation. As a result, the expansion due to the oxidation is very small and, often, contraction takes place. Therefore, the expansion due to the reduction/oxidation cycles can be effectively decreased even by suppressing the expansion due to the oxidation by having the metal M solidly dissolved therein as described above.

Among the oxidation/reduction expansion-suppressing metals M, Co entirely and solidly dissolves in the Ni phase; i.e., wettability is improved due to the solidly dissolved impurity effectively avoiding the expansion of the electrode support 31 due to the reduction/oxidation cycles.

The above description has dealt with the case of using $Y_2O_3$ as the inorganic skeletal material, which, however, also holds even when the other rare earth element oxide is used as the inorganic skeletal material.

In the present invention, the expansion due to the reduction/oxidation cycles can be decreased most effectively when a rare earth oxide and, particularly, $Y_2O_3$ is used as the inorganic skeletal material and when the oxidation/reduction expansion-suppressing metal M is Mn, Fe or Co.

The electrode support 31 may contain components in addition to Ni (or NiO), inorganic skeletal material and the oxidation/reduction expansion-suppressing metals M so far as the above-mentioned properties are not spoiled.

In a state where the wettability is enhanced between the Ni phase and the inorganic skeletal material phase, the electrode support 31 may expand at the time of initial reduction (usually called reduction expansion). Though the reason has not been clarified yet, it is presumed that this stems from the precipitation of Ni as NiO is reduced. It has been experimentally confirmed that the reduction expansion can be effectively suppressed by having Mg and, particularly, MgO solidly dissolved in the Ni phase. The amount of Mg is desirably in a range of 0.1 to 20 mol % per the total amount thereof with Ni (Mg+Ni).

(Fuel Electrode Layer 32)

In the present invention, the fuel electrode layer 32 triggers the electrode reaction of the formula (2) described above, and is made of a known porous and electrically conducting cermet. For example, the fuel electrode layer 32 is formed of $ZrO_2$ in which a rare earth element is solidly dissolved, and Ni and/or NiO. As the $ZrO_2$ (stabilized zirconia) in which the rare earth element is solidly dissolved, there can be used the one same as that used for forming the electrolyte layer 33 that will be described later.

It is desired that the content of the stabilized zirconia in the fuel electrode layer 32 is in a range of 35 to 65% by volume and that the content of Ni or NiO is 65 to 35% by volume. It is further desired that the fuel electrode layer 32 has an open porosity of not smaller than 15% and, particularly, in a range of 20 to 40%, and has a thickness of 1 to 30 μm. If the thickness of the fuel electrode layer 32 is too small, its performance may drop. If the thickness of the fuel electrode layer 32 is too large, on the other hand, exfoliation may occur due to a difference in the thermal expansion between the electrolyte layer 33 and the fuel electrode layer 32.

In the example of FIG. 1, the fuel electrode layer 32 is extending up to both sides of the interconnector 35. However, the fuel electrode may be formed so as to be present at a position facing the oxygen electrode 34. Namely, the fuel electrode layer 32 may be formed on only the flat portion A on, for example, the side where the oxygen electrode 34 is provided. Further, the fuel electrode layer 32 may be formed over the whole circumference of the electrode support 31. In the present invention, it is desired that the electrolyte layer 33 as a whole is formed on the fuel electrode layer 32 in order to enhance the junction strength between the electrolyte layer 33 and the support 31.

(Electrolyte Layer 33)

The electrolyte layer 33 formed on the fuel electrode layer 32 is made of dense ceramics called $ZrO_2$ (stabilized zirconia) in which a rare earth element is solidly dissolved, usually, in an amount of 3 to 15 mol %. As the rare earth element, there can be exemplified Sc, Y, La, Ce, Pr, Nd, Pm, Sm, Eu, Gd, Tb, Dy, Ho, Er, Tm, Yb and Lu. Among them, however, Y and Yb are desired since they are inexpensive.

From the standpoint of preventing gas permeability, it is desired that the stabilized zirconia ceramics forming the electrolyte layer 33 has a relative density (based on the Archimedes' method) of not smaller than 93% and, particularly, not smaller than 95% and has a thickness of 10 to 100 μm. The electrolyte layer 33 may be constituted by a perovskite composition of the type of lanthanum gallate in addition to being constituted by the stabilized zirconia.

(Oxygen Electrode Layer 34)

The oxygen electrode layer 34 is made of electrically conducting ceramics comprising a perovskite oxide of the so-called $ABO_3$ type. As the perovskite oxide, there can be preferably used a perovskite oxide of a transition metal and, particularly, at least one of an $LaMnO_3$ oxide, an $LaFeO_3$ oxide or an $LaCoO_3$ oxide having La on the A-site. Among them, the $LaFeO_3$ oxide is particularly desired from the standpoint of a high electrically conducting property at an operation temperature of about 600 to about 1000° C. The perovskite oxide may contain Sr in addition to La in the A-site, or may contain Co and Mn in addition to Fe in the B-site.

The oxygen electrode layer 34 must have gas permeability. It is, therefore, desired that the electrically conducting ceramics (perovskite oxide) forming the oxygen electrode 34 has an open porosity of not smaller than 20% and, particularly, in a range of 30 to 50%.

It is desired that the oxygen electrode layer 34 has a thickness of 30 to 100 μm from the standpoint of collecting electricity.

(Interconnector 35)

At a position facing the oxygen electrode layer 34, the interconnector 35 provided on the electrode support 31 comprises the electrically conducting ceramics which, however, comes in contact with the fuel gas (hydrogen) and the oxygen-containing gas. Therefore, the electrically conducting ceramics must have resistance against the reduction and resistance against the oxidation. As the electrically conducting ceramics, therefore, a peroviskite oxide ($LaCrO_3$ oxide) of the type of lanthanum chromite is usually used. In order to prevent the leakage of the fuel gas flowing inside the electrode support 31 and of the oxygen-containing gas flowing on the outer side of the electrode support 31, further, the electrically conducting ceramics must be dense and must, desirably, have a relative density of not smaller than 93% and, particularly, not smaller than 95%.

From the standpoint of preventing the leakage of gases and electric resistance, further, it is desired that the interconnector 35 has a thickness of 10 to 200 μm. If the thickness is smaller than the above range, gases tend to leak. If the thickness is larger than the above range, on the other hand, the electric resistance increases and the function for collecting electricity may decrease with a drop in the potential.

As is understood from FIG. 1, further, the dense electrolyte layer 33 is closely adhered to both sides of the interconnector 35 to prevent the leakage of gases. In order to improve the sealing, further, a junction layer (not shown) comprising, for example, $Y_2O_3$ may be provided between the electrolyte layer 33 and both side surfaces of the interconnector 35.

It is desired to provide a P-type semiconductor layer 39 on the outer surface (upper surface) of the interconnector 35. That is, in the cell stack assembled by stacking the fuel cells (see FIG. 2), an electrically conducting collector member 40 is connected to the interconnector 35. However, if the collector member 40 is directly connected to the interconnector 35, the potential drops greatly due to non-ohmic contact, and the electricity-collecting performance drops.

Upon connecting the collector member 40 to the interconnector 35 via the P-type semiconductor layer 39, however, the two come into ohmic contact with each other, whereby the potential drops less effectively averting a drop in the electricity-collecting performance. For instance, an electric current from the oxygen electrode layer 34 of one fuel cell 30 can be efficiently conducted to the electrode support 31 of another fuel cell 30. As the P-type semiconductor, there can be exemplified a perovskite oxide of a transition metal.

Concretely, there can be used the P-type semiconductor having an electron conductivity larger than that of the $LaCrO_3$ oxide that constitutes the interconnector 35. For example, there can be used P-type semiconductor ceramics comprising at least any one of an $LaMnO_3$ oxide, an $LaFeO_3$ oxide or $LaCoO_3$ oxide containing Mn, Fe or Co in the B-site. It is desired that the P-type semiconductor layer 39 has a thickness, usually, in a range of 30 to 100 μm.

The interconnector 35 can also be directly provided on the flat portion A of the electrode support 31 on the side on where the electrolyte layer 33 is not provided. In this portion, too, the fuel electrode layer 32 may be provided, and the interconnector 35 may be provided on the fuel electrode layer 32. That is, the fuel electrode layer 32 is provided over the whole circumference of the electrode support 31, and the interconnector 35 is provided on the fuel electrode layer 32. When the interconnector 35 is provided on the electrode support 31 via the fuel electrode layer 32, a drop of potential is suppressed on the interface between the electrode support 31 and the interconnector 35, which is advantageous.

(Production of the Electrode Support and Fuel Cell)

The electrode support 31 having the above-mentioned structure and the fuel cell equipped with the above electrode support 31 are produced as described below.

First, a powder of Ni or of an oxide thereof, a powder of an inorganic skeletal material such as $Y_2O_3$ and a powder of a compound containing the above-mentioned metal M for suppressing the oxidation/reduction expansion, are mixed at a predetermined ratio, and to which are further mixed an organic binder such as an acrylic resin or a polyvinyl alcohol and a solvent such as an isopropyl alcohol or water to prepare a slurry thereof. The slurry is then extrusion-molded into a molded body for forming an electrode support and is dried (the electrode support 31 is obtained by firing the molded body for forming the electrode support).

As the compound which includes the oxidation/reduction expansion-suppressing metals M, there can be used any compound provided it solidly dissolves in the Ni phase or forms a reaction product that precipitates on the grain boundaries. Usually, however, the metal M is used as an oxide (e.g., $Fe_2O_3$, $Mn_2O_3$, $Co_3O_4$, etc.). Further, the metal M may be used in the form of an alloy with Ni when the metal M is to be solidly dissolved in the Ni phase.

Next, the materials for forming the fuel electrode layer (Ni or NiO powder and a powder of stabilized zirconia), the organic binder and the solvent are mixed together to prepare a slurry and from which a sheet for forming the fuel electrode layer is formed. Instead of forming the sheet for forming the fuel electrode layer, further, a coating for forming the fuel electrode layer may be formed by applying a paste that is obtained by dispersing the material for forming the fuel electrode in a solvent, onto a predetermined position of the molded body for forming the electrode support.

Moreover, the electrolyte powder such as the stabilized zirconia powder, the organic binder and the solvent are mixed together to prepare a slurry and from which a sheet is obtained for forming the electrolyte layer.

The thus obtained molded body for forming the electrode support, the sheet for forming the fuel electrode and the sheet for forming the electrolyte are laminated so as to form a layer structure shown in, for example, FIG. 1, are dried and, as required, are calcined at a temperature of about 1000° C. Here, when a coating for forming the fuel electrode layer is formed on the surface of the molded body for forming the electrode support, the sheet for forming the electrolyte only may be laminated on the molded body for forming the electrode support.

Thereafter, the interconnector material (e.g., $LaCrO_3$ oxide powder), the organic binder and the solvent are mixed together to prepare a slurry thereof and from which a sheet for the interconnector is prepared.

The sheet for the interconnector is, further, laminated on a predetermined position of the laminate obtained above to thereby prepare a laminate for firing.

Next, the laminate for firing is subjected to the treatment for removing the binder, and is co-fired in an oxygen-containing atmosphere at 1300 to 1600° C. A paste containing a material for forming the oxygen electrode (e.g., $LaFeO_3$ oxide powder) and a solvent, and, as required, a paste containing a material for forming the P-type semiconductor layer (e.g., $LaFeO_3$ oxide powder) and a solvent, are applied by dipping or the like method onto a predetermined position of the obtained sintered product, and are baked at 1000 to 1300° C. to produce a fuel cell 30 equipped with the electrode support 31 of the structure shown in FIG. 1.

When metal nickel is used for forming the electrode support 31 and the fuel electrode layer 32, Ni is oxidized into NiO due to the firing in the oxygen-containing atmosphere, which, however, can be returned back to Ni through the reduction treatment (or by the exposure to the reducing atmosphere at the time of generating electricity).

The fuel cell 30 equipped with the electrode support 31 produced as described above is capable of effectively suppressing the expansion of volume of the electrode support 31 due to the reduction/oxidation cycles that accompany the generation of electricity (operation of the fuel cells 30) and stop of generation. It is, therefore, made possible to effectively prevent inconveniences such as occurrence of cracks in the electrolyte layer 33 due to the expansion or occurrence of exfoliation of the electrode support 31 and, therefore, to maintain reliability over extended periods of time.

(Cell Stack and Fuel Cell Assembly)

Referring to FIG. 2, the cell stack is constituted by a set of a plurality of fuel cells 30 described above, by interposing the collector member 40 made of a metal felt and/or a metal plate between one fuel cell 30 and another fuel cell 30 neighboring each other up and down, and connecting the two in series with each other. That is, the electrode support 31 of the one fuel cell 30 is electrically connected to the oxygen electrode 34 of the other fuel cell 30 via the interconnector 35, P-type semiconductor layer 39 and collector member 40. As shown in FIG. 2, further, the cell stacks are arranged side by side, and the neighboring cell stacks are connected in series with each other by the conductor members 42.

The fuel cell assembly of the above structure contains the cell stacks of FIG. 2 in a container. The container is provided with an introduction pipe for introducing the fuel gas such as hydrogen from the external unit into the fuel cells 30, and an introduction pipe for introducing the oxygen-containing gas such as the air into space on the outer side of the fuel cells 30. Upon being heated at a predetermined temperature (e.g., 600 to 900° C.), the fuel cells generate electricity, and the fuel gas and the oxygen-containing gas after used are discharged out of the container.

Not being limited to the above embodiment only, the present invention can be varied in a variety of ways without departing from the gist of the invention. For example, the electrode support 31 may be formed in a cylindrical shape, or the fuel cell 30 equipped with the electrode support 31 may include an intermediate layer having a suitable electrically conducting property formed between the oxygen electrode layer 34 and the electrolyte layer 33. Further, the above embodiment has described the case where the fuel electrode layer 32 was formed on the electrode support 31. However, the electrode support 31 itself may be imparted with a function of the fuel electrode, and the electrolyte layer and the oxygen electrode layer may be formed on the electrode support which works as the fuel electrode.

Figure 3:
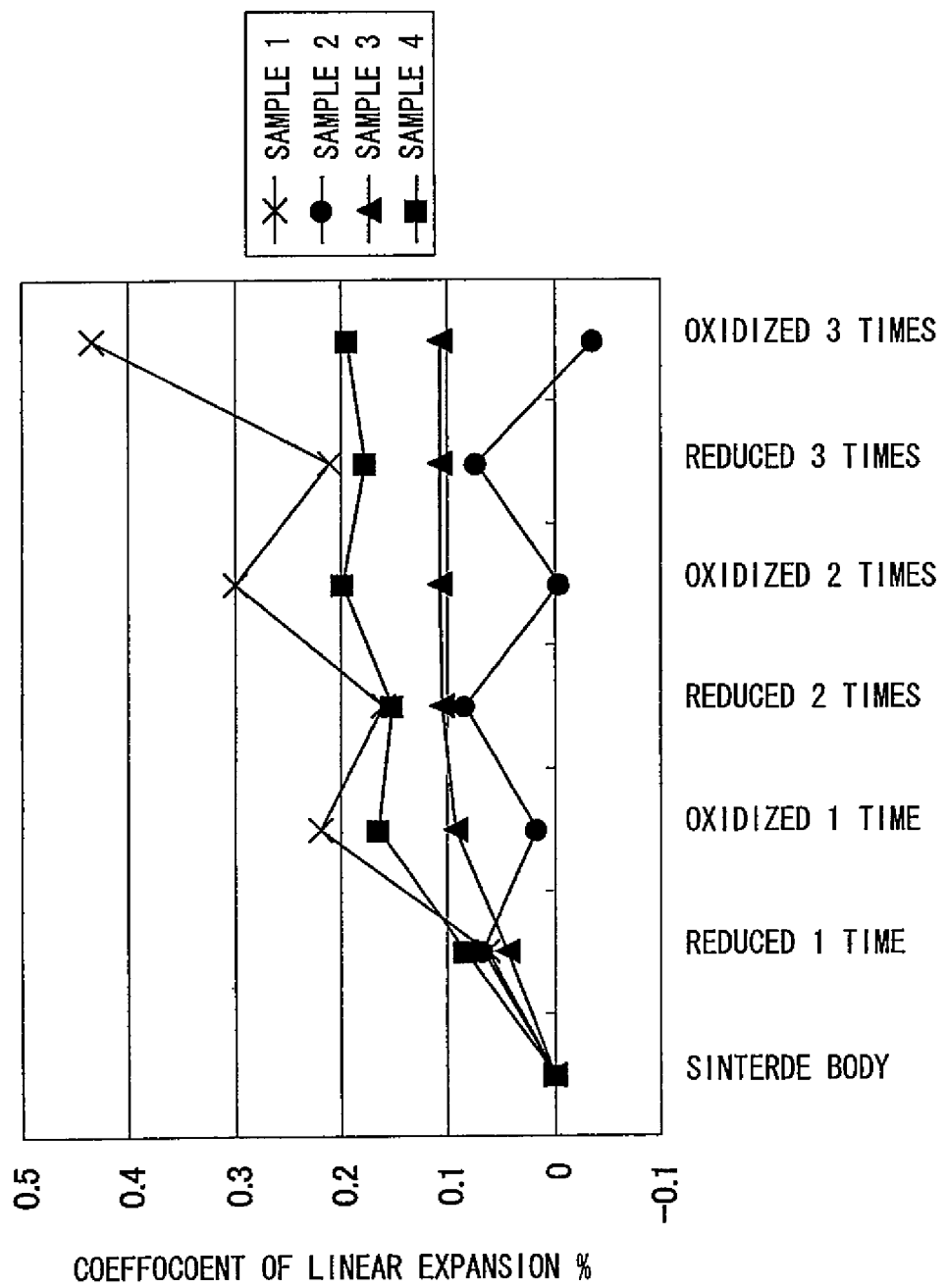
FIG. 3 is a graph showing coefficients of linear expansion of the electrode supports of samples Nos. 1 to 4 prepared in Experiment 1 after the reduction/oxidation cycle testing.

Next, the electrode supports were oxidized in an oxidizing atmosphere of 850° C. for 16 hours and were, thereafter, found for their coefficients of linear expansion in the same manner as described above. Similarly, further, the reduction/oxidation cycles were repeated three times to find the coefficients of linear expansion when reduced and oxidized up to three times, respectively. The results were as shown in FIG. 3 and in Table 1.

Further, the electrode supports machined as described above were measured for their electric conductivities by a 4-terminal method in a reducing atmosphere (850° C.) under an oxygen partial pressure of about $10^{-19}$ Pa. The results were as shown in Table 1.

TABLE 1

| Sample No. | $Mn_2O_3$ mass pts | Coefficient of linear expansion (%) | | | | | | Conductivity S/cm |
|---|---|---|---|---|---|---|---|---|
| | | 1st reduction | 1st oxidation | 2nd reduction | 2nd oxidation | 3rd reduction | 3rd oxidation | |
| *1 | 0.0 | 0.06 | 0.22 | 0.16 | 0.30 | 0.21 | 0.43 | 643 |
| 2 | 1.0 (1.5) | 0.07 | 0.02 | 0.08 | −0.01 | 0.07 | −0.04 | 633 |
| 3 | 1.5 (2.3) | 0.04 | 0.09 | 0.11 | 0.11 | 0.11 | 0.11 | 624 |
| 4 | 2.0 (3.0) | 0.08 | 0.16 | 0.15 | 0.20 | 0.18 | 0.19 | 616 |

Samples marked with * lie outside the scope of the invention.
Coefficients of linear expansion represent the expansion when the sign is plus and the contraction when the sign is minus.
In the column of $Mn_2O_3$ amounts, values in parentheses are in mol % (Mn/Mn + Ni).

EXAMPLE

Described below are Experiments to demonstrate excellent effects of the present invention.

(Experiment 1)

An NiO powder having an average particle size of 0.5 μm and a $Y_2O_3$ powder (having an average particle size of 0.6 to 0.9 μm) were mixed together in a manner that the amount of NiO after fired was 40% by volume calculated as Ni and the amount of $Y_2O_3$ was 60% by volume.

Next, an $Mn_2O_3$ powder (average particle size of 0.7 μm) was externally added in amounts as shown in Table 1 per 100 parts by mass of the above mixed powder, and mixed. Table 1 also shows the amounts (mol %) of Mn relative to the total amounts of Ni and Mn.

A slurry was prepared by mixing the above mixed powder, a pore-imparting agent (fibrous cellulose), an organic binder (polyvinyl alcohol) and water (solvent) together, extrusion-molded into a rectangular parallelopiped shape which was, then, dried, subjected to the treatment for removing the binder, and was fired in the open air at 1500° C. to prepare electrode supports (samples Nos. 1 to 4). However, the sample No. 1 did not at all contain the $Mn_2O_3$ powder.

The obtained electrode supports were machined into a height of 3 mm, a width of 4 mm and a length in the lengthwise direction of 40 mm, reduced in a reducing atmosphere of an oxygen partial pressure of about $10^{-19}$ Pa at 850° C. for 16 hours, cooled while still being in the reducing atmosphere, and were measured for their lengths in the lengthwise direction before and after the reduction to find coefficients of linear expansion when reduced (first time) in accordance with the following formula, Coefficient of linear expansion=(length after the reduction−length before the reduction)/(length before the reduction)

It will be understood from the results of Table 1 that addition of the $Mn_2O_3$ powder helps suppress the expansion due to the reduction/oxidation cycles. Further, if the amount of $Mn_2O_3$ is small, the expansion becomes minus (contraction) and if the amount is large, the expansion increases. Further, as the amount of $Mn_2O_3$ increases, the electric conductivity of the support slightly decreases but is still large enough. The amount of Mn is desirably in a range of 1 to 3 mol % per the total amount thereof with Ni (Mn+Ni).

FIGS. 4 to 7 illustrate the results of TEM analysis of the electrode support of the sample No. 3 produced above.

Figure 4:
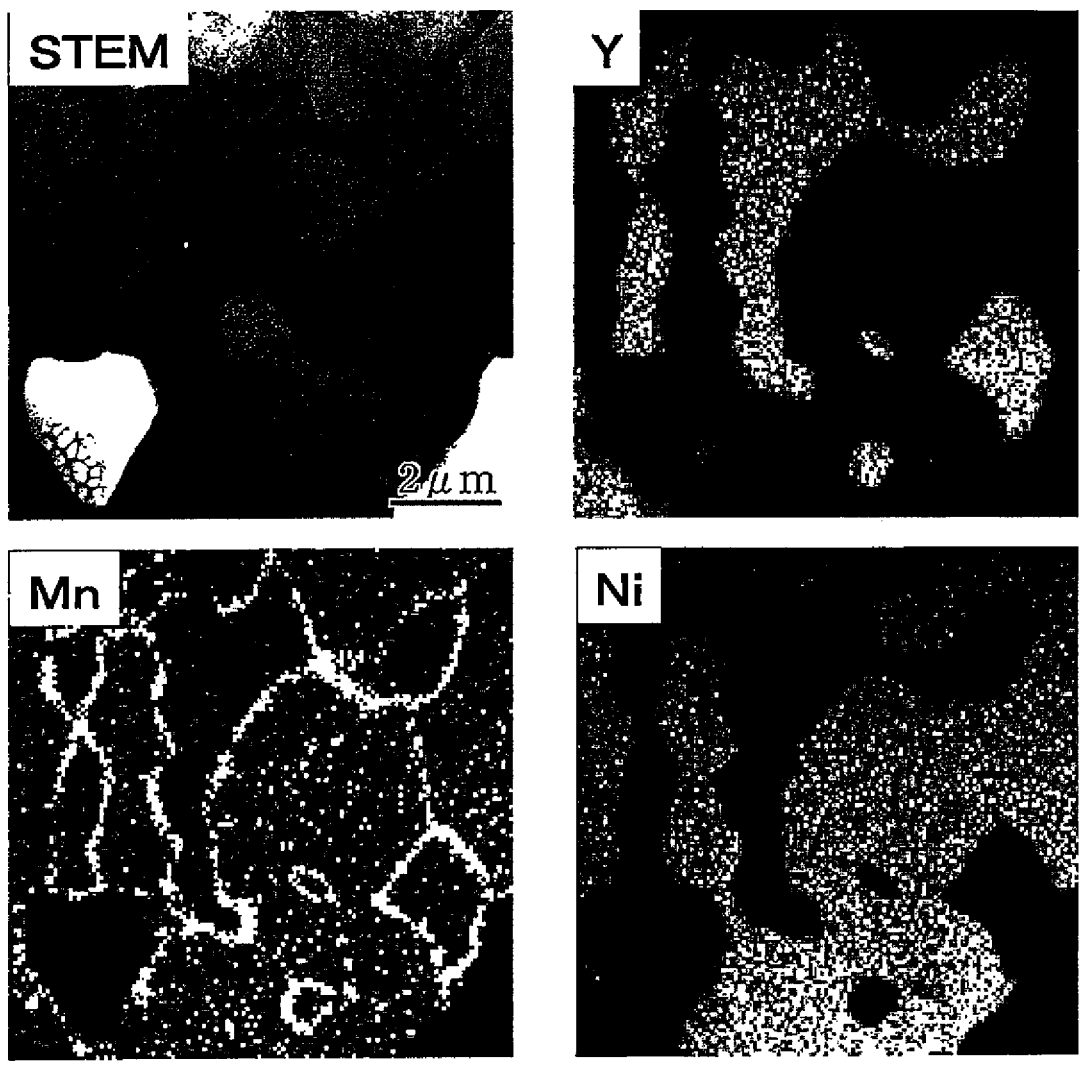
FIG. 4 is an elemental mapping image of the electrode support (present invention) of sample No. 3 prepared in Experiment 1 measured by the TEM-EDS.

It will be learned from FIG. 4 that Mn is present almost biasedly on the grain boundaries of Ni/$Y_2O_3$.

Figure 5:
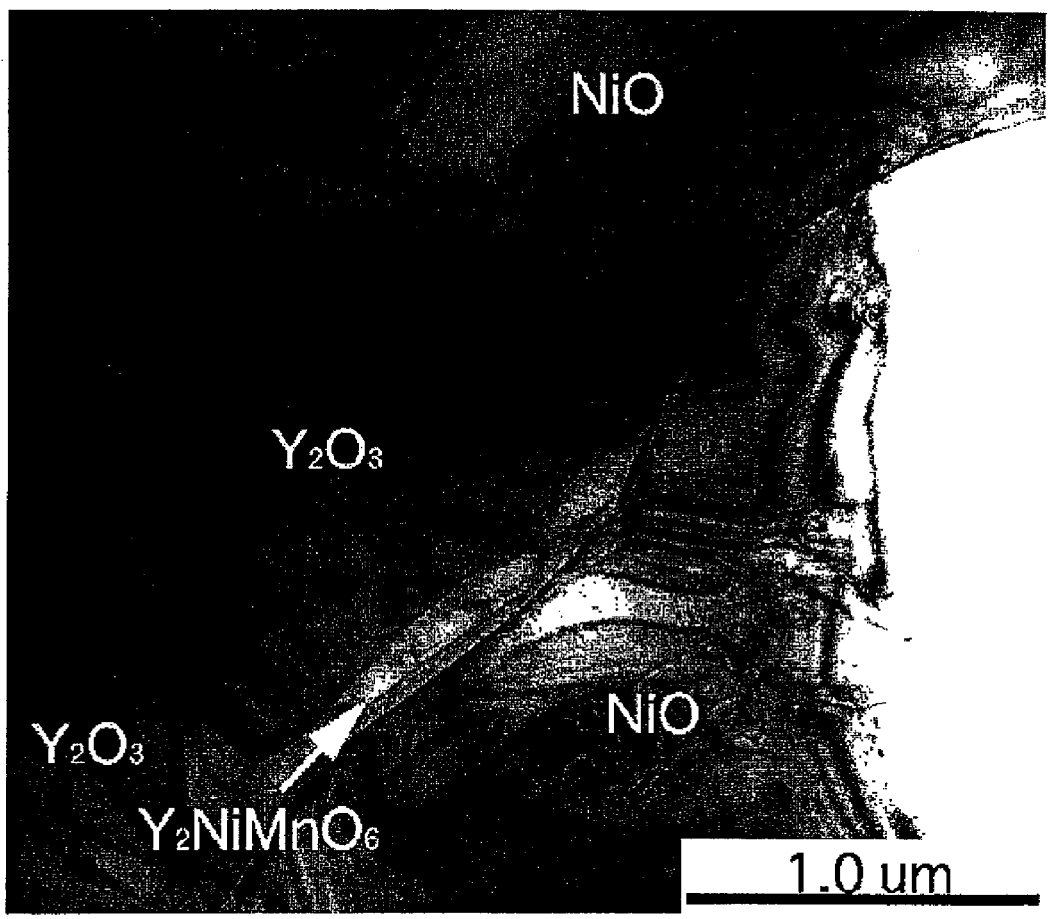
FIG. 5 is a bright visual field image of the electrode support (present invention) of sample No. 3 prepared in Experiment 1 measured by the TEM.
Figure 6:
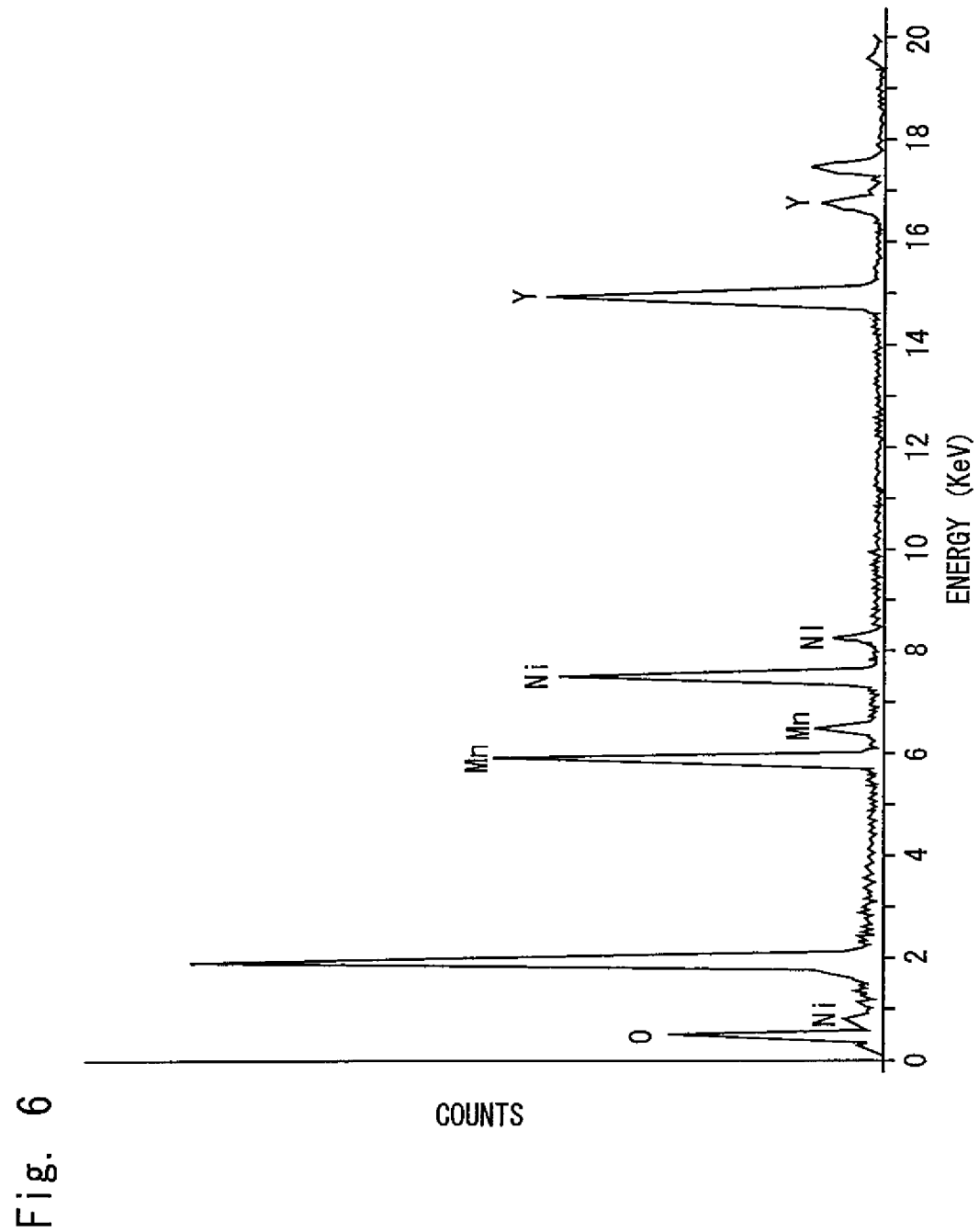
FIG. 6 is a diagram of elemental analysis spectra of the grain boundary phase of the electrode support (present invention) of sample No. 3 prepared in Experiment 1 measured by the TEM-EDS.
Figure 7:
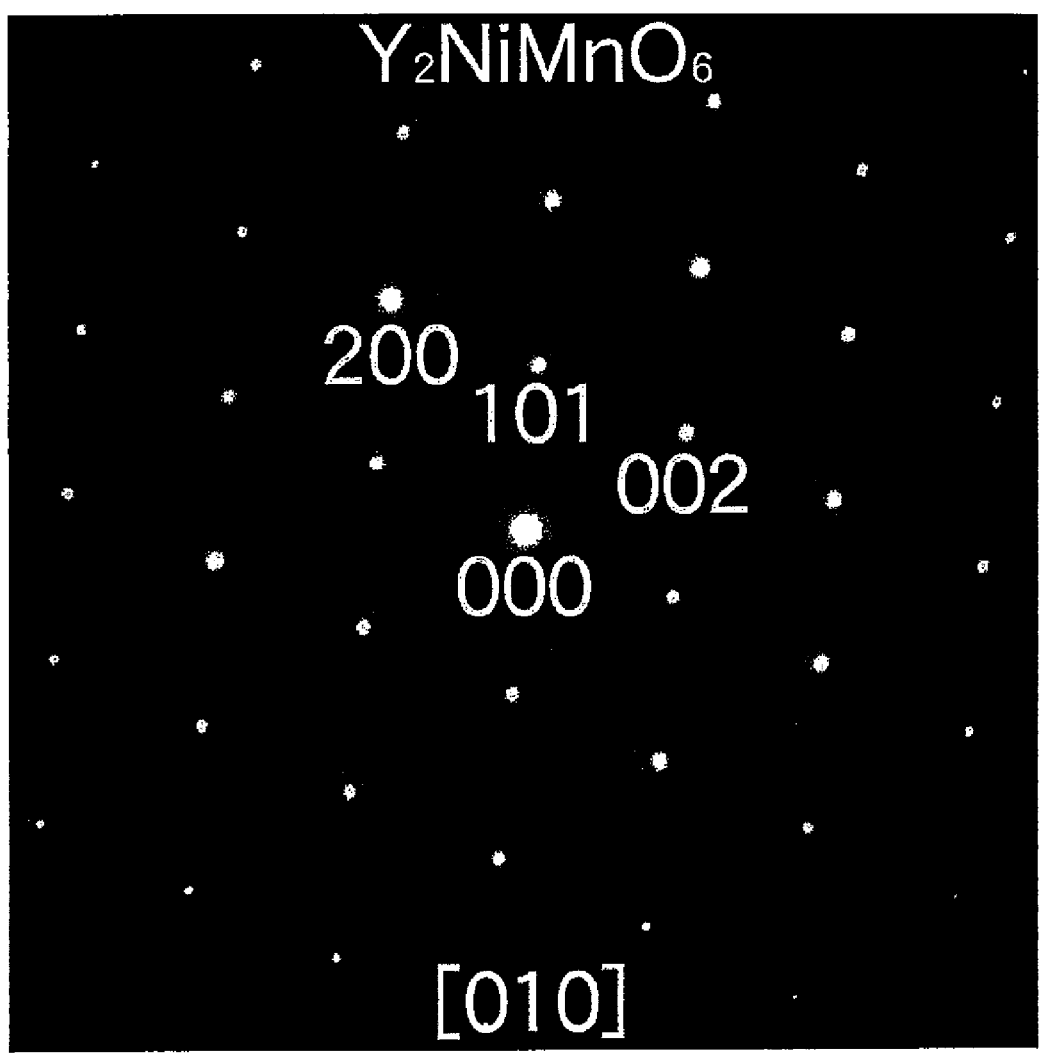
FIG. 7 shows the results of the limited visual field electron diffraction image analysis of the grain boundary phase of the electrode support (present invention) of sample No. 3 prepared in Experiment 1 measured by the TEM.

From FIGS. 5 to 7, it will be learned that Mn is distributed as a grain boundary phase of Ni/$Y_2O_3$, the grain boundary phase being $Y_2NiMnO_6$. It is, therefore, considered that the presence of the grain boundary phase suppresses the change in the shape of Ni in the reduction of the next time and suppresses the expansion of the electrode support caused by the subsequent reduction/oxidation cycles.

(Experiment 2)

Like in experiment 1, an NiO powder and a $Y_2O_3$ powder were mixed together in a manner that the amount of NiO after fired was 48% by volume calculated as Ni and the amount of $Y_2O_3$ was 52% by volume. An $Fe_2O_3$ powder having an average particle size of 0.7 μm was mixed in amounts as shown in Table 2 to 100 parts by mass of the above mixed powder to prepare the electrode supports (samples Nos. 5 to 9) like in Experiment 1. Table 2 also shows the amounts (mol %) of Fe relative to the total amounts of Ni and Fe.

Figure 8:
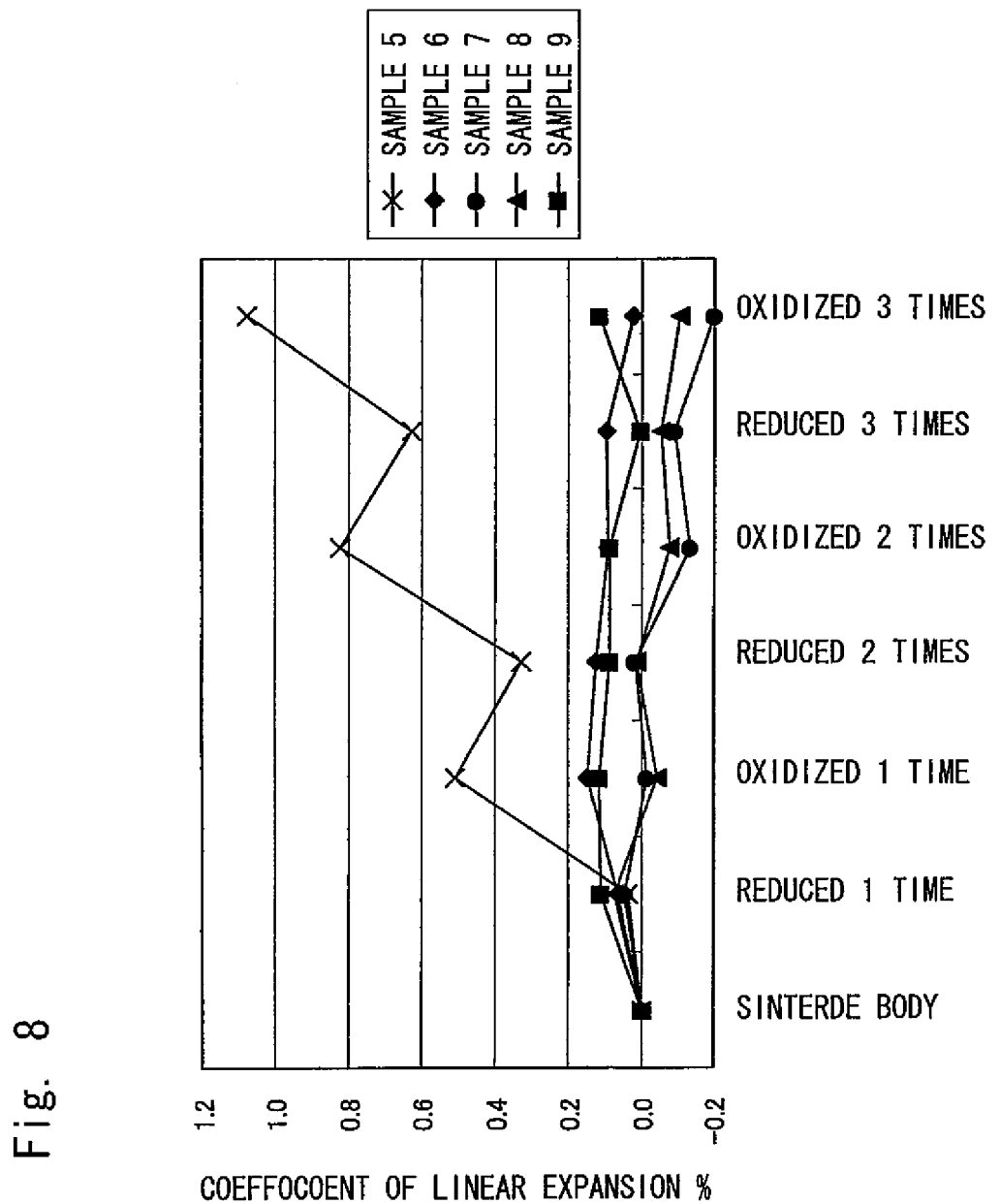
FIG. 8 is a graph showing coefficients of linear expansion of the electrode supports of samples Nos. 5 to 8 prepared in Experiment 2 after the reduction/oxidation cycle testing.

The obtained electrode supports were measured for their coefficients of linear expansion after the reduction/oxidation cycles of three times in the same manner as in Experiment 1, and the results were as shown in Table 2 and in FIG. 8. Further, the electric conductivities were measured in the reducing atmosphere like in Experiment 1 to obtain the results as shown in Table 2.

TABLE 2

| Sample No. | Fe$_2$O$_3$ mass pts | Coefficient of linear expansion (%) | | | | | | Conductivity S/cm |
| --- | --- | --- | --- | --- | --- | --- | --- | --- |
| | | 1st reduction | 1st oxidation | 2nd reduction | 2nd oxidation | 3rd reduction | 3rd oxidation | |
| *5 | 0.0 | 0.03 | 0.51 | 0.33 | 0.82 | 0.63 | 1.08 | 463 |
| 6 | 0.03 (0.04) | 0.06 | 0.15 | 0.12 | −0.09 | 0.10 | −0.02 | 727 |
| 7 | 0.2 (0.3) | 0.05 | −0.02 | 0.02 | −0.13 | −0.09 | −0.20 | 745 |
| 8 | 1.0 (1.3) | 0.08 | −0.04 | 0.01 | −0.08 | −0.05 | −0.11 | 1024 |
| 9 | 2.0 (2.7) | 0.11 | 0.12 | 0.09 | 0.09 | 0.01 | 0.12 | 1220 |

Samples marked with * lie outside the scope of the invention.
Coefficients of linear expansion represent the expansion when the sign is plus and the contraction when the sign is minus.
In the column of Fe$_2$O$_3$ amounts, values in parentheses are in mol % (Fe/Fe + Ni).

It will be understood from the results of Table 2 that addition of the Fe$_2$O$_3$ powder helps suppress the expansion due to the reduction/oxidation cycles. Further, if the amount of Fe$_2$O$_3$ is relatively small, the expansion becomes minus (contraction) and if the amount is large, the expansion increases. Further, as the amount of Fe$_2$O$_3$ increases, the electric conductivity of the support becomes high. The amount of Fe is desirably in a range of 0.04 to 3 mol % per the total amount thereof with Ni (Fe+Ni).

Figure 9:
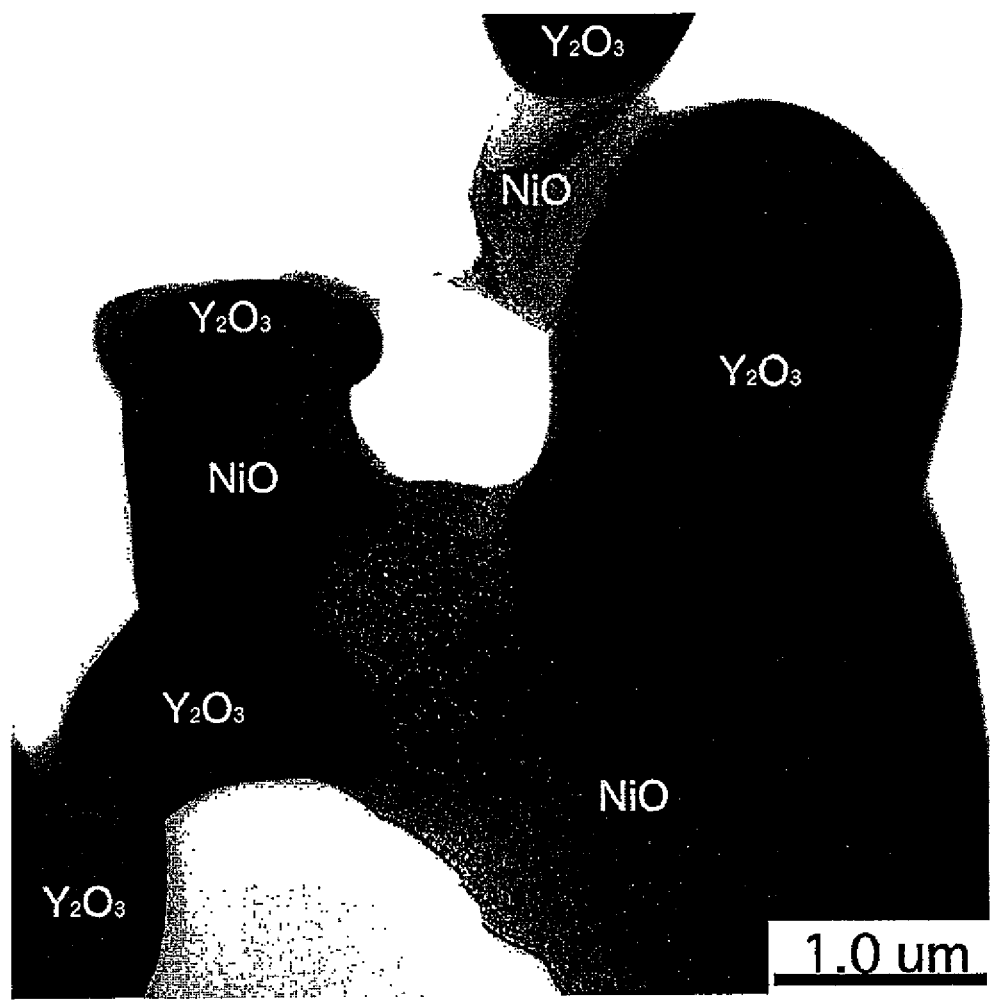
FIG. 9 is a bright visual field image of the electrode support (present invention) of sample No. 7 prepared in Experiment 2 measured by the TEM.
Figure 10:
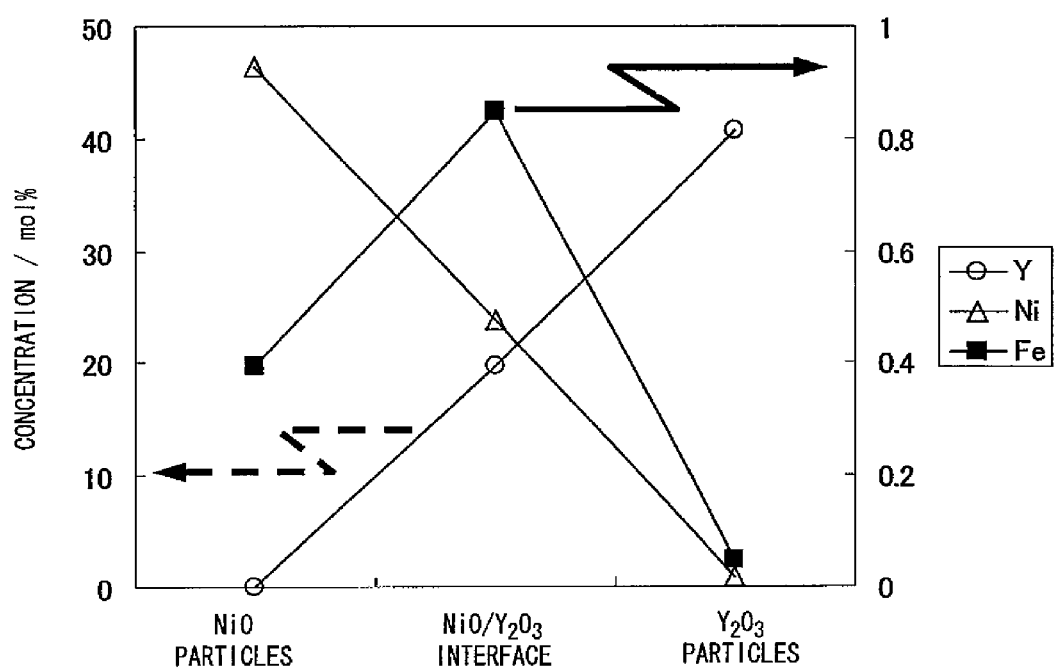
FIG. 10 is a diagram of the results of elemental analysis of the grain boundary portion of the electrode support (present invention) of sample No. 7 prepared in Experiment 2 measured by the TEM-EDS.
Figure 11:
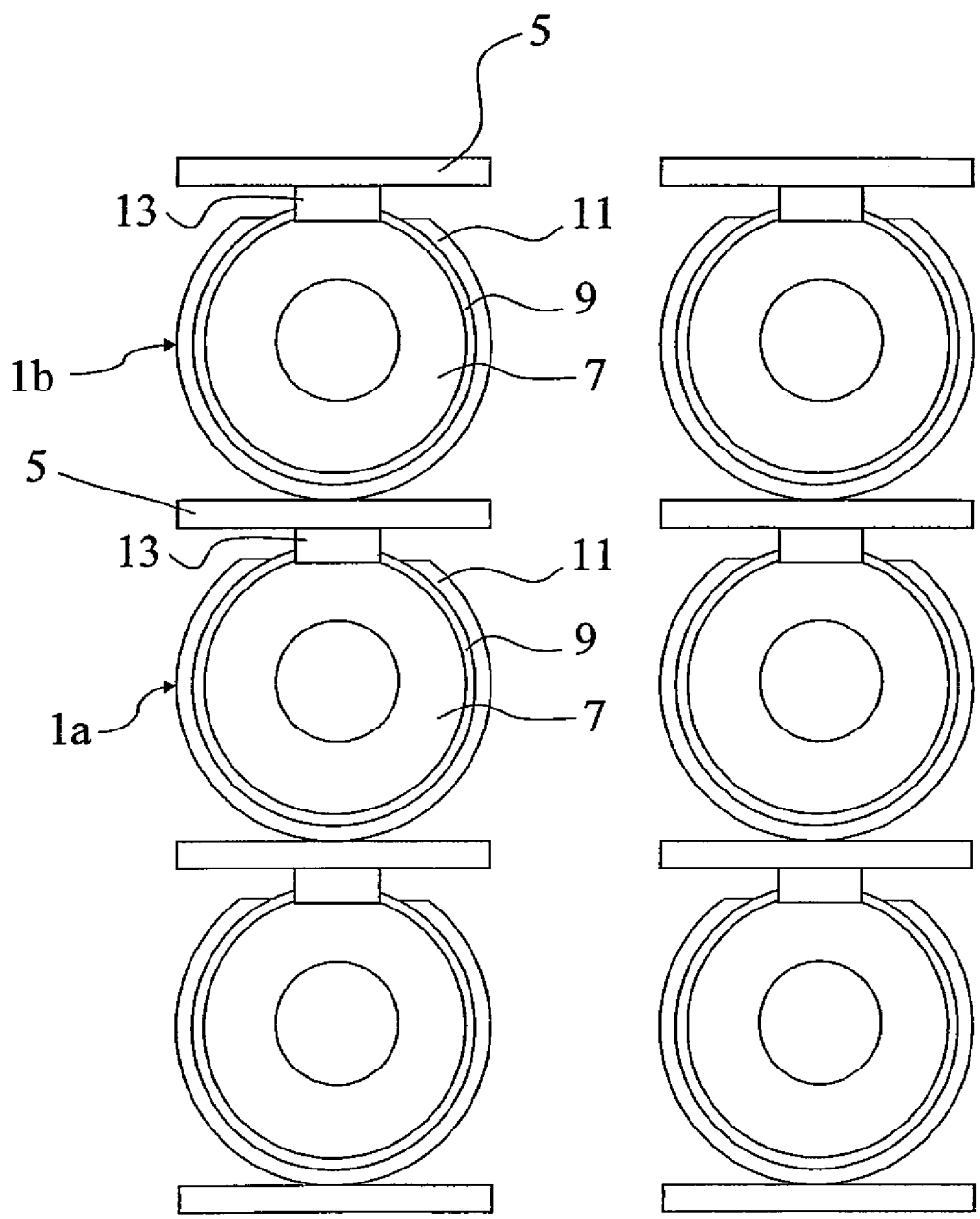
FIG. 11 is a transverse sectional view of cell stacks comprising conventional fuel cells.

FIGS. 9 and 10 illustrate the results of transmission electron microscope (TEM) analysis of the electrode supports. It will be learned from the results that no reaction product of Fe is precipitating on the grain boundaries of Ni/Y$_2$O$_3$ but Fe is biasedly distributed being solidly dissolved in the Ni phase. It is considered that despite of biasedly distributed on the grain boundaries, Fe works to suppress the change in the shape of Ni in the reduction of the next time and suppress the expansion of the electrode support caused by the subsequent reduction/oxidation cycles.

(Experiment 3)

An NiO powder, a Y$_2$O$_3$ powder and a Co$_3$O$^4$ powder were mixed together in a manner that the amount of (Ni, Co)O after fired was 48% by volume calculated as a total of Ni and Co and the amount of Y$_2$O$_3$ was 52% by volume to prepare the electrode supports (samples Nos. 10 to 12) in the same manner as in Experiment 1. Table 3 also shows the amounts (mol %) of Co relative to the total amounts of Ni and Co.

The obtained electrode supports were measured for their coefficients of linear expansion after the reduction/oxidation cycles of three times in the same manner as in Experiment 1, and the results were as shown in Table 3. Further, the electric conductivities were measured in the reducing atmosphere like in Experiment 1 to obtain the results as shown in Table 3.

It will be understood from the results of Table 3 that Co must be contained in an amount larger than that of Fe or Mn, and works to suppress the expansion of the support due to the reduction/oxidation cycles like the cases of Fe and Mn. It is desired that the amount of Co is in a range of 5 to 30 mol % per the total amount thereof with Ni (Co+Ni).

(Experiment 4)

The sample powders (samples Nos. 5 to 9) used in Experiment 2 were extrusion-molded in the same manner as in Experiment 2 to form the flat molded bodies for forming electrode supports, which were, thereafter, dried.

Next, a ZrO$_2$ (YSZ) powder containing 8 mol % of Y$_2$O$_3$, an NiO powder, an organic binder (acrylic resin) and a solvent (toluene) were mixed together to prepare a slurry and from which a sheet for forming a fuel electrode layer was prepared. By using the above slurry of the mixture of the YSZ powder, organic binder (acrylic resin) and toluene, further, a sheet for forming a electrolyte layer was prepared. The sheet for forming the fuel electrode layer and the sheet for forming the electrolyte layer were laminated.

The laminated sheets were wrapped around the molded body for forming the electrode support prepared above in a manner that one flat surface of the molded body was exposed (see FIG. 1), and were dried.

Further, a slurry was prepared by mixing an LaCrO$_3$ oxide powder having an average particle size of 2 μm, an organic binder (acrylic resin) and a solvent (toluene), and a sheet for forming the interconnector was prepared by using the slurry. The sheet for the interconnector was laminated on the exposed flat portion of the molded body for forming the electrode support to thereby prepare a sheet for sintering comprising the molded body for forming the electrode support, sheet for forming the fuel electrode layer, sheet for forming the electrolyte layer and sheet for forming the interconnector.

Next, the sheet for sintering was subjected to the treatment for removing the binder and was co-fired in the open air at 1500° C. to obtain a sintered body.

TABLE 3

| Sample No. | Co content | Coefficient of linear expansion (%) | | | | | | Conductivity S/cm |
| --- | --- | --- | --- | --- | --- | --- | --- | --- |
| | | 1st reduction | 1st oxidation | 2nd reduction | 2nd oxidation | 3rd reduction | 3rd oxidation | |
| 10 | 5.0 | 0.04 | 0.13 | 0.05 | 0.16 | 0.07 | 0.16 | 458 |
| 11 | 10.0 | 0.04 | 0.04 | 0.02 | 0.06 | 0.02 | 0.06 | 460 |
| 12 | 30.0 | 0.09 | 0.06 | 0.11 | 0.08 | 0.12 | 0.20 | 466 |

Co content is in mol % (Co/Co + Ni)

The obtained sintered body was immersed in a paste comprising an La$_{0.6}$Sr$_{0.4}$Co$_{0.2}$Fe$_{0.8}$O$_3$ powder (oxygen electrode material) having an average particle size of 2 μm and a solvent (normal paraffin) so as to form a coating for forming the oxygen electrode on the surface of the electrolyte layer formed on the sintered body. At the same time, the above paste was applied onto the outer surface of the interconnector to form a coating for forming the P-type semiconductor, followed by baking at 1150° C. to thereby fabricate fuel cells of the structure shown in FIG. 1 (samples Nos. 13 to 17).

The fabricated fuel cells possessed the flat portion A of the electrode support of a length of 26 mm, the arcuate portions B of a length of 3.5 mm and a thickness of 2.8 mm, the fuel electrode layer of a thickness of 10 µm, the electrolyte layer of a thickness of 40 µm, the oxygen electrode layer of a thickness of 50 µm, the interconnector of a thickness of 50 µm and the P-type semiconductor layer of a thickness of 50 µm.

The electrolyte layer of the obtained fuel cell was analyzed for its cross section by using Electron Probe Micro-analyzer (EPMA) to confirm the elements diffused from the electrode support. Further, the hydrogen gas was flown into the gas passages in the electrode support and the air was flown along the outer side of the fuel cell (outer surface of the oxygen electrode) to generate electricity at 850° C. for 100 hours. Thereafter, the supply of hydrogen gas was discontinued and the fuel cell was allowed to cool naturally (electrode support was oxidized).

Next, the interior of the fuel cell was pressurized while being submerged in water to observe if gas leaks. Further, occurrence of cracks in the electrode support and in the electrolyte layer, and exfoliation of the electrolyte layer and fuel electrode layer from the support board were observed by using a stereoscope. This cycle was repeated 3 times to obtain the results as shown in Table 4.

Further, after the fuel cells have been fabricated, each fuel cell was measured for its generating ability after operated at 850° C. for 100 hours (generation of the first time) to find the results as shown in Table 4.

TABLE 4

| Sample No. | Electrode support (sample) No. | Diffusion into solid electrolyte | Cracks 1st reduction | Cracks 1st oxidation | Cracks 2nd reduction | Cracks 2nd oxidation | Cracks 3rd reduction | Cracks 3rd oxidation | Generating performance W/cm$^2$ |
|---|---|---|---|---|---|---|---|---|---|
| *13 | 5 | — | no | yes | yes | yes | yes | yes | 0.20 |
| 14 | 6 | no | no | no | no | no | no | no | 0.41 |
| 15 | 7 | no | no | no | no | no | no | no | 0.41 |
| 16 | 8 | no | no | no | no | no | no | no | 0.43 |
| 17 | 9 | no | no | no | no | no | no | no | 0.44 |

Samples marked with * lie outside the scope of the invention.

As will be learned from the results of Table 4, none of the fuel cells of the invention (samples Nos. 14 to 17) developed cracks or exfoliation in the fuel electrode layer or in the electrolyte layer. Further, there was almost no diffusion and the generating performance was as good as not smaller than 0.41 W/cm$^2$.

The invention claimed is:

1. A solid oxide fuel cell comprising:

a structure having an electrode support, a fuel electrode, an electrolyte and an oxygen electrode arranged in this order, wherein said electrode support comprises a porous material having a Ni phase of Ni or NiO and an inorganic skeletal material phase, and wherein Fe is solidly dissolved in said Ni phase or is biasedly distributed on the grain boundaries between the Ni phase and the inorganic skeletal material phase, and the amount of Fe is in a range of 0.04 to 3 mol % per total moles of Ni and Fe.

2. A cell stack obtained by electrically connecting a plurality of fuel cells of claim 1.

3. A fuel cell assembly obtained by containing the cell stack of claim 2 in a container.

4. A solid oxide fuel cell according to claim 1, wherein said inorganic skeletal material is an oxide of a rare earth element.

5. A solid oxide fuel cell according to claim 1, wherein said inorganic skeletal material is $Y_2O_3$.

6. A solid oxide fuel cell according to claim 1, wherein said Fe precipitated in the form of $NiFe_2O_4$ or $FeYO_3$ on the grain boundaries.

7. A solid oxide fuel cell according to claim 1, wherein said Fe is biasedly distributed on the grain boundaries.

* * * * *